United States Patent
Maurer et al.

(10) Patent No.: US 11,746,893 B2
(45) Date of Patent: Sep. 5, 2023

(54) THERMAL MANAGEMENT OF A VEHICLE TRANSMISSION

(71) Applicant: Eaton Cummins Automated Transmission Technologies, LLC, Galesburg, MI (US)

(72) Inventors: Adam C. Maurer, Portage, MI (US); Graeme A. Jackson, Kalamazoo, MI (US)

(73) Assignee: Eaton Cummins Automated Transmission Technologies, Galesburg, MI (US)

(*) Notice: Subject to any disclaimer, the term of this patent is extended or adjusted under 35 U.S.C. 154(b) by 0 days.

(21) Appl. No.: 17/398,210

(22) Filed: Aug. 10, 2021

(65) Prior Publication Data
US 2022/0099178 A1    Mar. 31, 2022

Related U.S. Application Data (60) Provisional application No. 63/085,967, filed on Sep. 30, 2020.

(51) Int. Cl.
*B60W 10/10*      (2012.01)
*F16H 59/72*      (2006.01)
(Continued)

(52) U.S. Cl.
CPC ............ *F16H 59/72* (2013.01); *B60W 10/06* (2013.01); *B60W 10/10* (2013.01);
(Continued)

(58) Field of Classification Search
CPC ...... B60W 10/30; B60W 10/10; B60W 10/06; B60W 30/1843; B60W 2510/1075;
(Continued)

(56) References Cited

U.S. PATENT DOCUMENTS

2013/0240315 A1* 9/2013 Tao .................... F16H 59/72
                                                      192/3.54
2017/0166181 A1* 6/2017 Song ..................... B60K 6/48
(Continued)

FOREIGN PATENT DOCUMENTS

CN    101985294 A  *  3/2011
CN    102080717 A  *  6/2011  ......... F16H 57/0413
JP    2004125028 A *  4/2004

OTHER PUBLICATIONS

English translation of CN101985294A; http://translationportal.epo.org; Nov. 16, 2022 (Year: 2022).*

(Continued)

*Primary Examiner* — Roger L Pang
(74) *Attorney, Agent, or Firm* — James J. Pingor (57) ABSTRACT

A transmission is subject to thermal management to prevent damage or failure due to overheating. Sensors can be employed to capture characteristics of a transmission, such as fluid temperature or pressure. Further, a predictive model can be invoked to predict characteristics based on current and future conditions. Characteristics can be compared with a threshold for intervention. A thermal mitigation strategy can be generated and initiated when characteristics satisfy the threshold. The thermal mitigation strategy can specify various actions to dissipate heat, including altering shift control logic and triggering mechanical devices that can increase airflow, reduce air temperature, or both surrounding the transmission.

13 Claims, 8 Drawing Sheets

(51) Int. Cl.
    *F16H 57/04*     (2010.01)
    *F16H 61/16*     (2006.01)
    *B60W 10/06*     (2006.01)
    *B60W 30/184*     (2012.01)

(52) U.S. Cl.
    CPC ..... *B60W 30/1843* (2013.01); *F16H 57/0416* (2013.01); *F16H 61/16* (2013.01); *B60W 2510/107* (2013.01); *B60W 2510/1075* (2013.01); *B60W 2710/0666* (2013.01); *B60W 2710/1005* (2013.01)

(58) Field of Classification Search
    CPC ... B60W 2510/107; B60W 2710/0666; B60W 2710/1005; B60W 2710/30; F16H 59/72; F16H 57/0416; F16H 61/16; F16H 2061/0241; F16H 57/0412; F16H 2061/163; F16H 63/50; F16H 2063/508

USPC .............................................. 701/58, 54, 56
See application file for complete search history.

(56) References Cited

U.S. PATENT DOCUMENTS

2018/0023701 A1*   1/2018   Shin ................... F16H 57/0446
                                                                 60/413
2021/0024070 A1*   1/2021   Honda ..................... F01M 1/08

OTHER PUBLICATIONS

English translation of CN102080717A; http://translationportal.epo.org; Nov. 16, 2022 (Year: 2022).*

* cited by examiner

THERMAL MANAGEMENT OF A VEHICLE TRANSMISSION

CROSS-REFERENCE TO RELATED APPLICATION

This application claims the benefit of U.S. Provisional Application No. 63/085,967, filed Sep. 30, 2020, and entitled "THERMAL MANAGEMENT SHIFT LOGIC AND TRANSMISSION AMBIENT TEMPERATURE CONTROL," the entirety of which is incorporated herein by reference.

BACKGROUND

Controlling transmission temperature plays an essential role in maintaining proper vehicle function. For instance, if the transmission fluid temperature is too hot, a vehicle may need to be turned off to allow the transmission to return to a safe operating temperature. Overheating may also impact the overall efficiency of the vehicle. Transmission fluid coolers can be added to a vehicle for an additional cost to reduce the transmission fluid temperature.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, the subject disclosure pertains to thermal management of a vehicle transmission. One or more transmission characteristics, such as pressure and temperature of a transmission, or portions thereof, can be captured and compared with a threshold associated with a desire to intervene to prevent heat-related wear, damage, or failure. If the characteristics satisfy the threshold, a thermal mitigation strategy can be determined and executed to reduce the temperature. In one instance, the thermal mitigation strategy can specify triggering a change in gear shift logic. For example, a gear can be skipped, or the transmission can be encouraged to stay in overdrive longer than usual to reduce heat that would otherwise be generated. In another instance, the thermal mitigation strategy can specify activation of one or more mechanical devices to increase airflow, decrease air temperature, or both surrounding the transmission. For instance, the mechanical device can correspond to a fan or vent.

According to one aspect, a system is provided comprising a processor coupled to a memory that includes instructions that, when executed by the processor, cause the processor to determine a pressure state based on a transmission fluid pressure received from a pressure sensor, evaluate temperature of a transmission received from a temperature sensor with respect to a threshold temperature, determine a thermal mitigation strategy when the temperature satisfies the threshold temperature based on the pressure state and temperature, and initiate execution of the thermal mitigation strategy. The instructions can further cause the processor to invoke a predictive model to predict the temperature of the transmission based on driving condition data, determine the thermal mitigation strategy based on a predicted temperature, initiate the thermal mitigation strategy prior to the temperature satisfying the threshold based on a predicted temperature satisfying the threshold. In one instance, the thermal mitigation strategy corresponds to modifying shift control logic and locking out a gear from a set of available gears for selection or causing the transmission to remain in direct drive. Further, the thermal mitigation strategy can comprise instructing a torque control unit of an engine to limit the torque to the transmission. In another instance, the thermal mitigation strategy comprises activation of a mechanical device to increase airflow or reduce air temperature surrounding the transmission. The mechanical device can be a fan, duct, or vent. In one scenario, the mechanical device can be an adjustable speed radiator fan, and activation comprises increasing the speed of the radiator fan. If the mechanical device is a duct or vent, activation can comprise opening the duct or vent. Further, in one instance, the threshold temperature depends on the pressure state.

According to another aspect, a method is provided comprising evaluating transmission fluid pressure received from a pressure sensor, evaluating a temperature of a transmission received from a temperature sensor, generating a thermal mitigation strategy based on evaluation of the pressure and temperature of the transmission, and initiating execution of the thermal mitigation strategy. The method can further comprise triggering generation of the thermal mitigation strategy in response to the temperature satisfying a temperature threshold associated with intervention. Further, the method can classify the pressure as low, normal, or high and determine the temperature threshold based on the classification. The method can further comprise invoking a predictive model to predict the temperature of the transmission fluid based on driving conditions and initiating the thermal mitigation strategy prior to the temperature satisfying the threshold based on a predicted temperature satisfying the threshold. Generating the thermal mitigation strategy can further comprise specifying one or more mitigation actions based on the pressure and temperature. In one instance, generating the thermal mitigation strategy comprises specifying a change to shift control logic that reduces heat. In another instance, generating the thermal mitigation strategy comprises specifying activation of a physical device to increase airflow or reduces air temperature in an environment surrounding the transmission.

In accordance with another aspect, a method executes, on a processor, instructions that cause the processor to perform operations. The operations include invoking a predictive model to predict transmission fluid temperature and pressure based on current and future driving conditions, determining a predicted pressure state based on the pressure, determining a threshold temperature for intervention based on the predicted pressure state, evaluating a predicted fluid temperature from the predictive model against the threshold temperature, and generating a thermal mitigation strategy when the predicted fluid temperature satisfies the threshold temperature based on the pressure and temperature. Generating the thermal mitigation strategy can further comprise specifying altering shift control logic to lockout a gear and specifying activation of a mechanical device to increase airflow or decrease air temperature surrounding the transmission.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel fea-

DETAILED DESCRIPTION

A transmission heated beyond a safe operating temperature can cause heat-related damage. Fluid within a transmission can be heated based on vehicle loads, weather, driver habits, driving conditions, and vehicle configuration, among other factors. Operation of a transmission with fluid at a temperature beyond a safe range can decrease shifting performance, reduce efficiency, and potentially result in catastrophic failure. Conventionally, a transmission fluid cooler can be added to address thermal issues through a continuous process. Fluid heated by the transmission can flow out of the transmission to the cooler, which dissipates the heat. The cooled fluid can then be routed back to the transmission through a return line. However, transmission fluid coolers add to vehicle cost and are often a source of failure, resulting in a need for transmission repair or replacement. Consequently, a need exists for an alternative to transmission fluid coolers.

Details disclosed herein generally pertain to thermal management of a vehicle transmission. A transmission can be equipped with sensors to measure the characteristics of the transmission or transmission fluid. In one instance, transmission temperature can be compared with a threshold value that can correspond to a standard or overheated temperature or temperature range. If the temperature satisfies a threshold corresponding to overheating, one or more actions can be triggered as part of a thermal mitigation strategy. The triggering mechanism can further be enhanced based on other data such as transmission fluid pressure. For example, the thermal mitigation strategy can be different based on whether the temperature is associated with low, normal, and high oil pressure. Furthermore, temperature or pressure can be predicted and employed to trigger thermal mitigation.

A thermal mitigation strategy can specify one or more of several techniques to reduce transmission temperature. In one instance, a shift pattern of the transmission can be altered to reduce heat that an unaltered shift pattern would otherwise generate. In another instance, a mechanical device can be triggered to help with cooling. For example, a fan can be activated. In one case, the fan can be a separate transmission fan. In another case, the fan can be associated with another component, such as the radiator. As another example, air vents can be opened to allow more air to circulate around the transmission. Moreover, the thermal mitigation strategy can be targeted or tailored based on current conditions and heat dissipation properties of available techniques. Further, a predictive model can be employed to initiate thermal mitigation strategies before the transmission overheats or reaches an otherwise undesirable temperature based on conditions that indicate the transmission fluid would be affected. Still further yet, additional techniques can also be employed, such as static changes to design or color and dynamic changes provided by a transmission fluid cooler, for instance.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
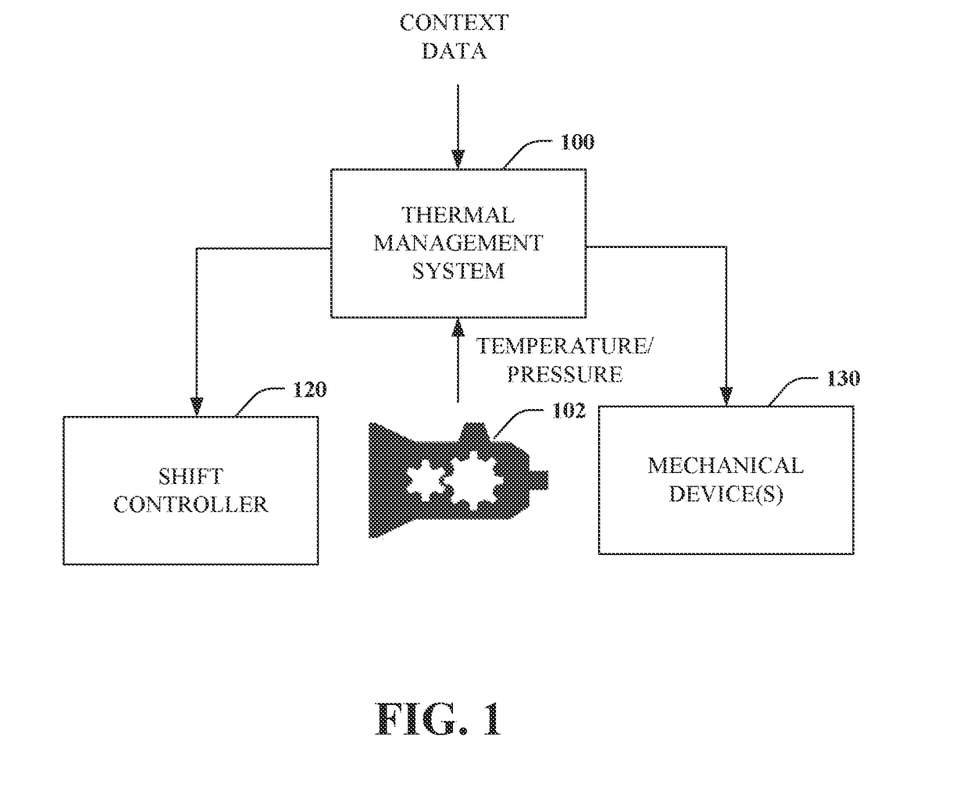
FIG. 1 illustrates an overview of an example implementation including a thermal management system.

Referring initially to FIG. 1, a high-level overview of an example implementation is depicted. As shown, the implementation includes thermal management system 100, transmission 102, shift controller 120, and mechanical device 130. The thermal management system 100 can receive input such as temperature and pressure data associated with the transmission 102 and context data. Further, the thermal management system 100 can provide output to the shift controller 120 and the mechanical device 130 following a determined thermal mitigation strategy.

The thermal management system 100 is operable to monitor the transmission and determine and initiate thermal mitigation strategies to dissipate excess heat. The thermal management system 100 can receive temperature data from a sensor associated with the transmission. In one instance, a sensor can measure the temperature of the internal transmission fluid. Additionally, a sensor can measure the external temperature of the transmission or the environment surrounding the transmission. A sensed temperature can be compared to a threshold temperature. The threshold temperature can identify an undesirable temperature or range of temperatures that can cause damage, decreased shift performance, or otherwise operate inefficiently. If the sensed temperature satisfies the threshold, a thermal mitigation strategy can be determined and triggered by way of the shift controller 120 or the mechanical device 130, for example. Other factors beyond temperature can also be considered in determining a thermal mitigation strategy, such as pressure. For instance, pressure states of high, normal, and low can be employed alone or in conjunction with temperature to determine thermal mitigation strategy.

In one scenario, the thermal mitigation strategy can be determined and initiated in real-time or near real-time given sensed conditions. However, the thermal management system 100 can intervene sooner. More specifically, the thermal management system 100 can invoke a predictive model based on context data, such as current and future driving conditions, and predict a temperature, pressure, or both. Mitigation strategies can then be selected and initiated based on a predicted temperature or pressure satisfying a threshold. In this way, thermal mitigation can be proactive. Further, such predictions can be employed in place of data from a faulty or failed sensor. Of course, the thermal mitigation strategy can also adjust based on current sensed temperatures.

The transmission 102 is a machine that controls application of power from a rotational power source to another device by way of gears or gear ratios. The term transmission can refer to an entire drivetrain, including clutch, gearbox, and shaft, among other things. Herein, the term is meant to refer to the gearbox alone. Further, the transmission 102 is intended to refer to a motor vehicle transmission. The transmission 102 transforms engine output to wheel rotation of a vehicle. Moreover, the transmission 102 can convert engine output to high torque at low speeds and maximum power at high speeds. The transmission 102 can include transmission fluid such as oil to lubricate metal parts and, in some instances, provide hydraulic pressure and friction to enable the internal components to operate. In accordance with an aspect of this disclosure, the transmission 102 can include internal or external sensors communicatively coupled to the thermal management system 100. For example, a temperature sensor or pressure sensor can periodically report output wirelessly to the thermal management system 100. Alternatively, the thermal management system 100 can periodically request and receive temperature or pressure from sensors.

The shift controller 120 is a mechanism responsible for controlling shifting or transitioning between gears to ensure a vehicle performs given varying road conditions, speeds, and vehicle loads. The shift controller 120 is configured to maximize performance and ensure torque and power are allocated as needed and expected by a driver. In furtherance of these goals, the shift controller 120 employs shift logic that considers various factors such as current speed, gear, load, and road conditions, among other things, to select and initiate a gear transition or shift. Shift logic is often optimized for performance. In accordance with one aspect, the shift logic is modified to consider transmission temperature, pressure, and thermal mitigation. As a result, the shift logic can be altered in a manner that seeks to reduce the addition of heat through more efficient shifts than would otherwise be performed. For example, a particular gear can be removed or locked out from a shift pattern. Each gear has a particular efficiency, and if the overall performance loss is insignificant, a gear can be dropped. For instance, sixth gear can be removed from a shift pattern in favor of fifth gear and seventh gear. Further, the shift logic can be modified to remain in direct drive as much as possible without significantly impacting performance while also limiting produced heat.

The mechanical device 130 can be any means or mechanism to increase airflow or reduce temperature in an environment surrounding the transmission 102. In one instance, the mechanical device can be a fan, such as a radiator fan. In some instances, the radiator fan can be turned off. However, the thermal management system 100 can cause the fan to be turned on, if off, to increase airflow around the transmission. In the case of a variable speed radiator fan, the fan's speed can be increased from a current rate to aid in increased airflow. In another instance, the mechanical device 130 can be a dedicated transmission fan that seeks to improve airflow around the transmission. Other mechanical devices can correspond to vents or ducts that can be activated and deactivated. For example, vents can be included in aerodynamic skirting on a truck that can be opened and closed. When open, the vents can bring in cooler air from outside the transmission environment as well as increase airflow. One or more mechanical devices can be activated and deactivated as needed to manage transmission temperature. However, in some cases, mechanical devices can be employed that are static and cannot be activated or deactivated, such as always open vents or a continuously running fan. Further, it should be appreciated that the transmission 102 can also have static mechanisms to aid in cooling, such as a coating or color that aid in heat dissipation.

Additional thermal mitigation actions are also possible and contemplated. For example, an engine can include a torque controller. In this case, torque can be controlled or reduced to aid in thermal mitigation. Peak engine torque can be capped to alter the effect on the transmission.

Figure 2:
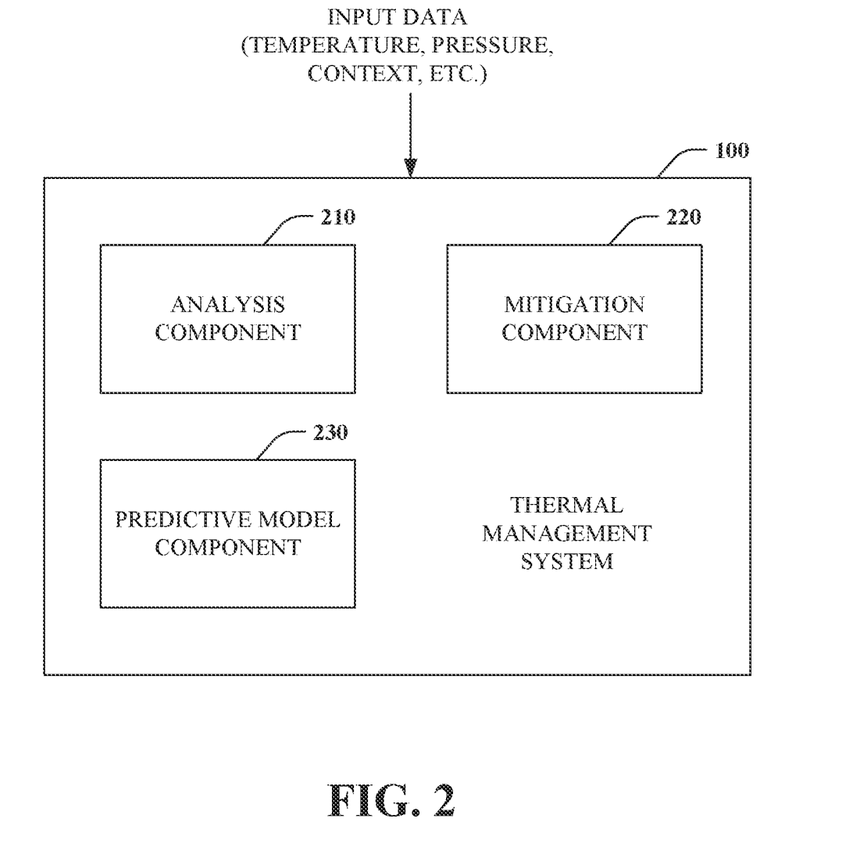
FIG. 2 is a block diagram of a thermal management system.

FIG. 2 depicts the thermal management system 100 in further sample detail. The thermal management system 100 includes analysis component 210, mitigation component 220, and predictive model component 230. In accordance with one embodiment, the analysis component 210, mitigation component 220, and predictive model component 230 can be implemented by a processor coupled to a memory that stores instructions that, when executed, cause the processor to perform the functionality of each component. As a result, a computing device is configured to be a special-purpose device that implements the functionality of the thermal management system 100.

The analysis component 210 is configured to analyze input data, such as sensor data associated with a transmission, and trigger the mitigation component 220 when appropriate. In a simple case, the analysis can involve acquiring a threshold temperature or range of temperatures and comparing the threshold temperature to a current temperature provided by a temperature sensor. The threshold temperature can correspond to a point at which thermal mitigation should be initiated, for example, to prevent wear or failure, and can be transmission specific. If the result of the comparison is that the transmission satisfies the threshold temperature, the analysis component 210 can trigger the mitigation component 220. Otherwise, the analysis component 210 can continue to monitor and compare current temperature to the threshold temperature.

The analysis component 210 can be enhanced by using other sensor data, such as pressure from a fluid pressure sensor. That analysis component 210 can then determine whether or not to initiate mitigation component 220 based on both pressure and temperature associated with a transmission. Various combinations of pressure and temperature data can be associated with a need for mitigation while others do not. In accordance with one aspect, the pressure state can be determined based on the pressure value. The pressure state can be classified as low, normal, or high. Normal correspond to a standard or expected pressure. Low denotes abnormally low pressure below normal. High signifies abnormally high pressure above normal. A temperature threshold can then be related to a pressure state. For instance, if the pressure is normal and the temperature does not satisfy a threshold, mitigation need not be triggered on this basis. By contrast, if the pressure is low and the temperature high, as indicated by meeting a threshold, the mitigation component 220 can be notified. Further, pressure state and temperature can be factors in determining the type or extent of mitigation.

The mitigation component 220 is operable to determine and initiate performance of a thermal mitigation strategy. A thermal mitigation strategy aims to dissipate heat and lower the temperature of the transmission to avoid heat-related damage. A thermal mitigation strategy can include a set of one or more mitigation actions. In general, the mitigation actions seek to improve airflow, reduce ambient temperature, or both within a transmission environment. Improved airflow aids in heat transfer by convection. Further, exchanging air within a transmission environment with cooler outside air can facilitate heat transfer through conduction and convection. The mitigation component 220 can determine and trigger mitigation actions. Of course, a variety of passive thermal mitigation can also be employed.

Figure 3:
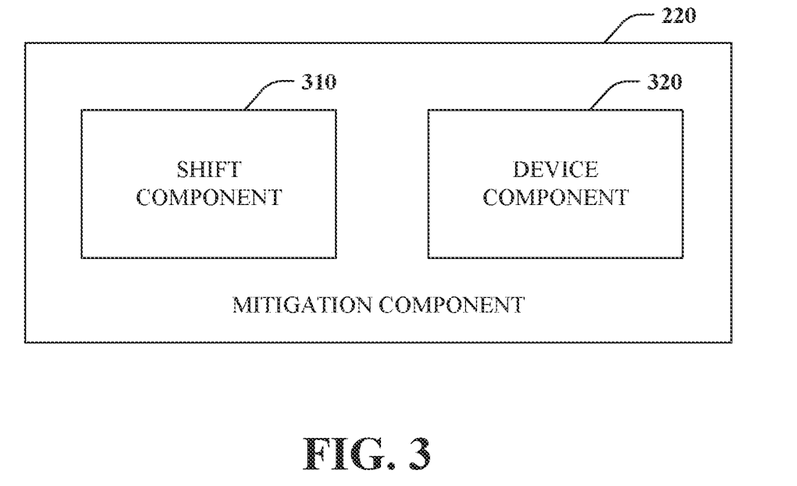
FIG. 3 is a block diagram of a mitigation component.

Turning attention briefly to FIG. 3, the mitigation component 220 is illustrated in further example detail. As shown, the mitigation component 220 can include shift component 310 and device component 320. In one instance, the shift component 310 and the device component 320 can be embodied as computer-executable instructions stored in a memory that, when executed by a processor, cause the processor to perform operations associated with each component and implement the functionality of the mitigation component 220.

The shift component 310 is operable to interact with a shift controller of a vehicle transmission to alter or influence shift logic to account for thermodynamic concerns. Efficiency can impact thermodynamics in that there is a relationship between efficiency and heat. The more inefficient a transmission is in gear selection, the more heat can be generated. By contrast, less heat will be produced with more efficient gear selection. Each gear can have a particular efficiency. This efficiency information can be considered in determining which gear a transmission should be in to help manage transmission temperature. When transmission temperature reaches a concern state (e.g., overheating), efficiency or thermal information associated with a transmission can be evaluated and utilized to bias shift points to gears, putting less stress on the transmission and transmission components.

If the shift logic is on the edge of using two different gears, the shift component 310, when activated, can nudge selection to the most efficient gear. In one particular instance, a gear can be removed as a candidate for a shift when performance loss is not significant and efficiency is increased. For example, sixth gear can be removed such that the shift controller would be required to use either fifth or seventh gear instead. In another instance, a transmission can be biased toward remaining in direct drive as much as possible to reduce transmission impact and thus heat. In one implementation, the shift component 310 can set a flag, or Boolean variable, to activate a portion of shift logic code that incorporates thermal concerns in the shift logic. In this manner, the shift component can set the flag when a concern state is reached and unset the flag when no longer in a concern state.

The device component 320 is configured to activate or control operation of a thermal mitigation device. A thermal mitigation device can correspond to any mechanism that can at least increase airflow or decrease ambient temperature surrounding a transmission. In one instance, the thermal mitigation device can correspond to a fan. In this case, the device component 320 can trigger operation of a fan to increase airflow. The fan can be a dedicated fan or a fan associated with another vehicle component, such as a radiator fan. In the case of a radiator fan, there can be times when the fan is turned off and activated by the device component 320 to aid in improving airflow. Furthermore, a radiator or dedicated fan can be a variable speed fan. Accordingly, the device component 320 can activate the fans and set a particular fan speed to aid heat dissipation. The fan speed can be determined based on how far the current temperature is from a desired temperature. For example, the fan speed would be faster if the current temperature was ten degrees higher than the desired temperature than it would be if the current temperature was within a degree of the desired temperature. The device component 320 can also activate or control other thermal mitigation devices such as vents or ducts.

A vehicle can include active vents or ducts associated with transmission cooling. The vents can be integrated into a vehicle body or an accessory such as an aerodynamic skirt. Such vents can be opened or closed to certain degrees to allow cooler external air to surround the transmission. Again, the degree to which a vent is opened or closed can depend on how significant the difference is between current and desired temperatures. The device component 320 can activate and control a plurality of thermal mitigation devices to reach the desired temperature. Once achieved, the device component 320 can deactivate or otherwise return devices to default settings.

In one instance, an engine can include a torque controller that can adjust engine torque. The mitigation component 220 can also employ this functionality to limit torque to the transmission to aid in thermal mitigation. For example, the mitigation component 220 can send a torque control unit command to the engine to cap peak engine torque. Reducing or restricting peak engine torque can reduce the introduction of additional heat associated with high torque.

Returning to FIG. 2, recall that the thermal management system also includes the predictive model component 230. The predictive model component 230 is configured to predict when thermal mitigation will be needed and proactively trigger a thermal mitigation strategy. The predictive model component 230 can correspond to any artificial intelligence or statistical model. For example, the predictive model component 230 can employ a machine learning (e.g., supervised or unsupervised), artificial neural network, or deep learning model. By way of example, the predictive model can correspond to a supervised machine learning model comprising one of various types of regression (e.g., linear, logistic, support vector, decision tree . . . ) to predict transmission fluid temperature based on available context data, including current temperature, speed, weather, and upcoming driving conditions, among other things. Alternatively, a classifier can be employed to classify a transmission as needing or not needing thermal mitigation. Regardless of particulars, the predictive model can be generated, for instance, based on training data capturing historical impact of various factors such as current temperature, weather and driving conditions. For example, it can be learned that an incline increases temperature by a particular quantity while a decline decreases temperature by another quantity. Further, traveling in traffic at slow speeds may increase the temperature a particular amount, while rain can be determined to decrease temperature another amount. Overall, the predictive model can learn how factors impact transmission temperature and utilize that knowledge to make predictions. The predictions can be provided as input to trigger thermal mitigation by the mitigation component 220 proactively to avoid overheating or high-temperature spikes.

In addition to current temperature, the analysis component 210 can receive and operate with respect to a predicted temperature provided by the predictive model component 230. As a result, the predicted temperature can be compared with the same or a different threshold as the current temperature. If the comparison reveals that the predicted temperature satisfies the threshold, the mitigation component 220 can be triggered to initiate thermal mitigation. In one instance, the current and predicted temperatures can both be considered to determine if and when to trigger mitigation through the mitigation component 220. For example, if there is no mitigation being performed with respect to a current temperature, yet the predicted temperature indicates mitigation is desirable, mitigation can be triggered. Alternatively, suppose the current temperature dictates that mitigation is desirable, but the predicted temperature indicates mitigation will not be needed. In that case, mitigation can still be initiated and sustained until the current temperature is satisfactory. In accordance with one aspect, the analysis component 210 can forward more information than a mere trigger to aid mitigation decisions.

The predictive model component 230 can be configured to predict current temperature or pressure associated with a transmission in one embodiment. Predicted temperature or pressure can be employed if a sensor fails or is otherwise faulty. Further, a prediction can be utilized when a vehicle does not have a transmission temperature or pressure sensor. By way of example, current temperature can be predicted based on gear, input torque, input speed, and time (e.g., time in particular configuration). The pressure can be predicted based on the temperature as the hotter transmission fluid becomes, the thinner it becomes, resulting in reduced pressure.

The mitigation component 220 can be configured to make strategic decisions regarding the extent of mitigation to initiate. More specifically, the mitigation component 220 can generate a mitigation strategy for a particular situation given data provided by at least the analysis component 210. The mitigation strategy can be configured for various degrees of cooling or heat dissipation. For example, the mitigation strategy can be quite different for a transmission that is one degree over a threshold versus fifteen degrees over the threshold. A single mitigation technique or action such as altering shift logic or activating a fan may be enough to reduce the temperature. By contrast, both may be needed to cool the transmission by fifteen degrees. In one embodiment, the difference between a threshold and current temperature can determine the mitigation strategy selected. Use of other factors to determine the mitigation strategy is also possible. For example, both pressure and temperature can dictate a mitigation strategy. A mitigation strategy can vary based on various combinations of pressure states (e.g., high, normal, and low) and temperature (e.g., hot, normal, cold). Further, pressure can control the temperature at which degraded performance will be triggered. For instance, performance degradation, in terms of shift schedule, gear lockout, and torque reduction, can be triggered at a lower temperature (e.g., 105 degrees Celsius) for a low-pressure state and a higher temperature (e.g., 118 degrees Celsius) for a normal/standard pressure state. Further, the extent of degradation can vary based on pressure.

As per prediction, the predictive model component 230 can return a level of confidence associated with a prediction. For example, a temperature prediction of four hundred degrees Fahrenheit can be accompanied by a confidence level of ninety, meaning it is ninety percent likely that the temperature will be four hundred degrees. This level of confidence can also be considered in determining a mitigation strategy. For instance, for a confidence level below forty, no action can be taken, while for a confidence level between forty and seventy, only a fraction of cooling capability will be activated. For a confidence level above seventy, full cooling capability can be activated.

The mitigation strategy can be determined or selected in a variety of ways. For example, predetermined rules can be defined for when specific mitigation actions are activated based on the level of temperature reduction needed or the confidence level of a prediction. A second predictive model can also be generated and invoked to provide suggestions regarding which mitigation actions to activate. In this instance, the model can be trained and refined based on data that captures the extent to which each action dissipates heat. The model can then suggest a mitigation strategy comprising a combination of actions to dissipate a desired quantity of heat.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished following either a push and/or pull control model. The components may also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers, . . . ). Such components, among others, can automate certain mechanisms or processes performed thereby, making portions of the systems and methods more adaptive as well as efficient and intelligent. By way of example, and not limitation, the predictive model component 230 of the thermal management system 100 can employ such mechanisms to predict or otherwise infer temperature changes based on changing conditions. Additionally, the mitigation component 220 can use such mechanisms to infer and suggest a thermal mitigation strategy to address overheating.

In view of the example systems described above, methods that may be implemented in accordance with the disclosed subject matter will be better appreciated with reference to flow chart diagrams of FIGS. 4-7. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 4:
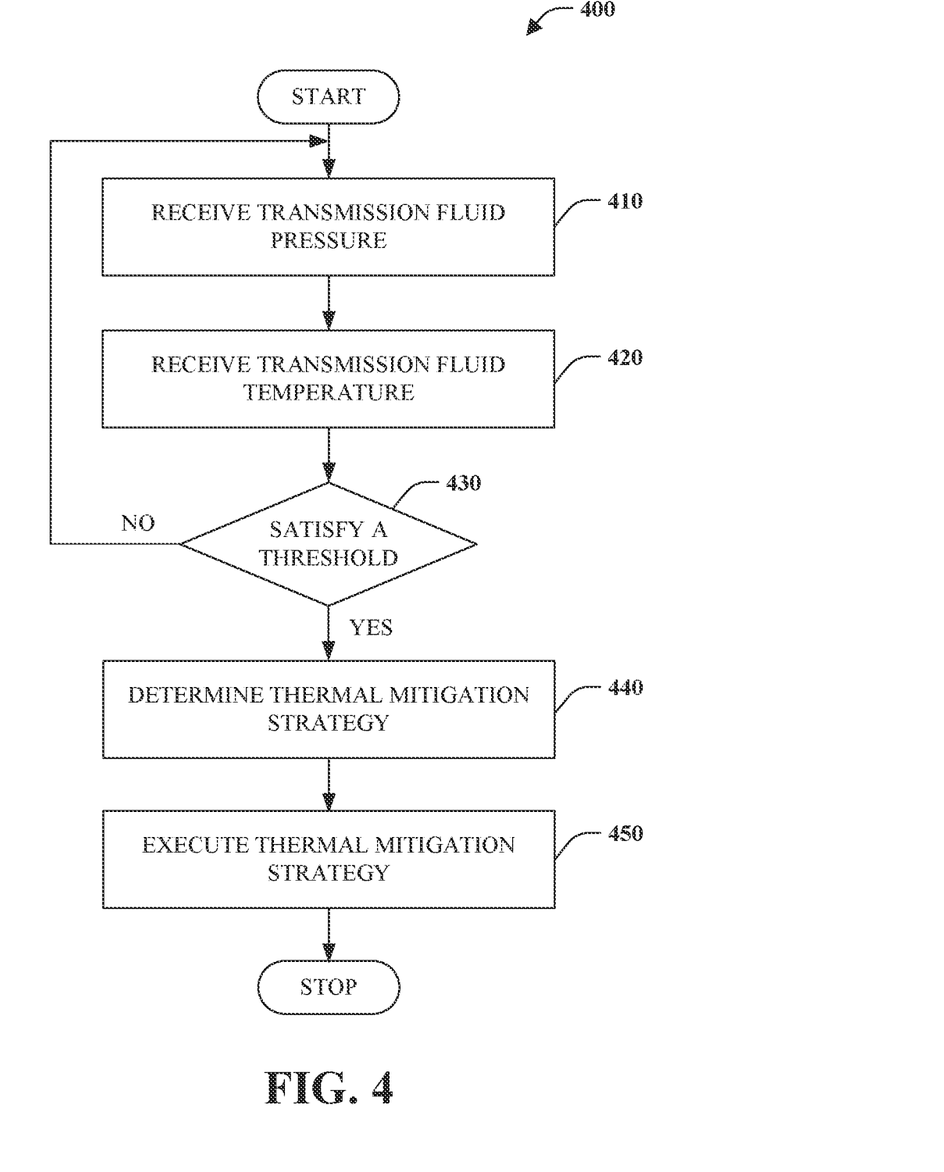
FIG. 4 is a flow chart diagram of a method of thermal mitigation activation.

FIG. 4 illustrates a method 400 of thermal mitigation. The method 400 can be performed by the thermal management system 100 of FIG. 1.

At reference numeral 410, a transmission pressure is received, retrieved, or otherwise obtained or acquired. For example, the pressure can be supplied by wire or wirelessly from a pressure sensor associated with the transmission. Suppose a pressure sensor is not available or is faulty. In that case, the pressure can also be derived, inferred, or predicted from other data, including historical data associated with the same or similar transmission and circumstances.

At reference numeral 420, a transmission temperature is received, retrieved, or otherwise obtained or acquired. In one embodiment, the temperature of transmission fluid is received. For example, a temperature in a sump or other reservoir for transmission fluid or oil can be determined by a temperature sensor and returned. Additionally, the temperature sensor can detect the temperature outside the transmission on a case or surrounding environment. The temperature can be received by way of wireless or wired communication.

At numeral 430, a determination is made as to whether a threshold has been satisfied or not. The threshold captures a circumstance for which thermal mitigation is desire, for example, to prevent potential expedited wear, damage, or failure from overheating. The threshold can be a single value or range of values associated with one or more transmission characteristics such as pressure and temperature. In one embodiment, thresholds can be related to both pressure and temperature. In this scenario, the determination pertains to whether thresholds associated with both pressure and temperature are satisfied. In one particular embodiment, pressure can be classified as low, normal, or high, and the threshold can relate to pressure. For example, the threshold can indicate that high or low pressure can satisfy the threshold. In another embodiment, the temperature threshold can be dependent on the pressure state. For instance, if the pressure is normal, a first temperature may need to be reached to satisfy the threshold. Still, if the pressure is high or low, a second or third different temperature may need to be achieved that is higher or lower than the first temperature. If the threshold is satisfied ("YES"), the method proceeds to reference numeral 440. If the threshold is not satisfied ("NO"), the method returns to reference numeral 410.

At numeral 440, a thermal mitigation strategy is determined. The thermal mitigation strategy can specify one or more mitigation actions to address current or predicted thermal concerns by dissipating heat, reducing heat-inducing activities, or both. Furthermore, the thermal mitigation strategy can be tailored or fined tuned to particular circumstances. In this manner, performance can be impacted as needed, and other resources can be efficiently employed. The thermal mitigation strategy can specify various actions.

In one instance, gear shift logic can be adapted for thermal mitigation. Specific duty cycles cause transmission fluid temperature to become higher than desired. Some gear paths are more efficient than others, meaning certain power paths will heat the transmission less compared to others. This feature can be exploited to reduce heat when activated. For example, a particular gear such as sixth gear can be removed from shift logic as an option, or the shift logic can seek to remain in direct drive as much as possible to reduce heat.

In another instance, a mechanical device can be activated to increase airflow or airspeed, decrease temperature, or both with respect to a transmission environment. In one scenario, the fan can be a dedicated transmission fan. In another scenario, the fan can be the radiator fan, including a variable speed radiator fan. The mechanical device can also be a vent or duct such that activation corresponds to opening a vent. The vent can bring in cooler air from outside a transmission environment to aid in reducing transmission temperature by conduction as well as convention.

In yet another instance, the actions can control torque applied to the transmission. In some embodiments, an engine can include a torque controller. Commands can be provided to the torque controller to reduce or cap torque. By reducing or capping torque, less heat can be added to the transmission.

At reference numeral 450, the thermal mitigation strategy is executed. In other words, mitigation actions outlined in the mitigation strategy can be initiated or triggered in an attempt to return a transmission to desired operating conditions.

Figure 5:
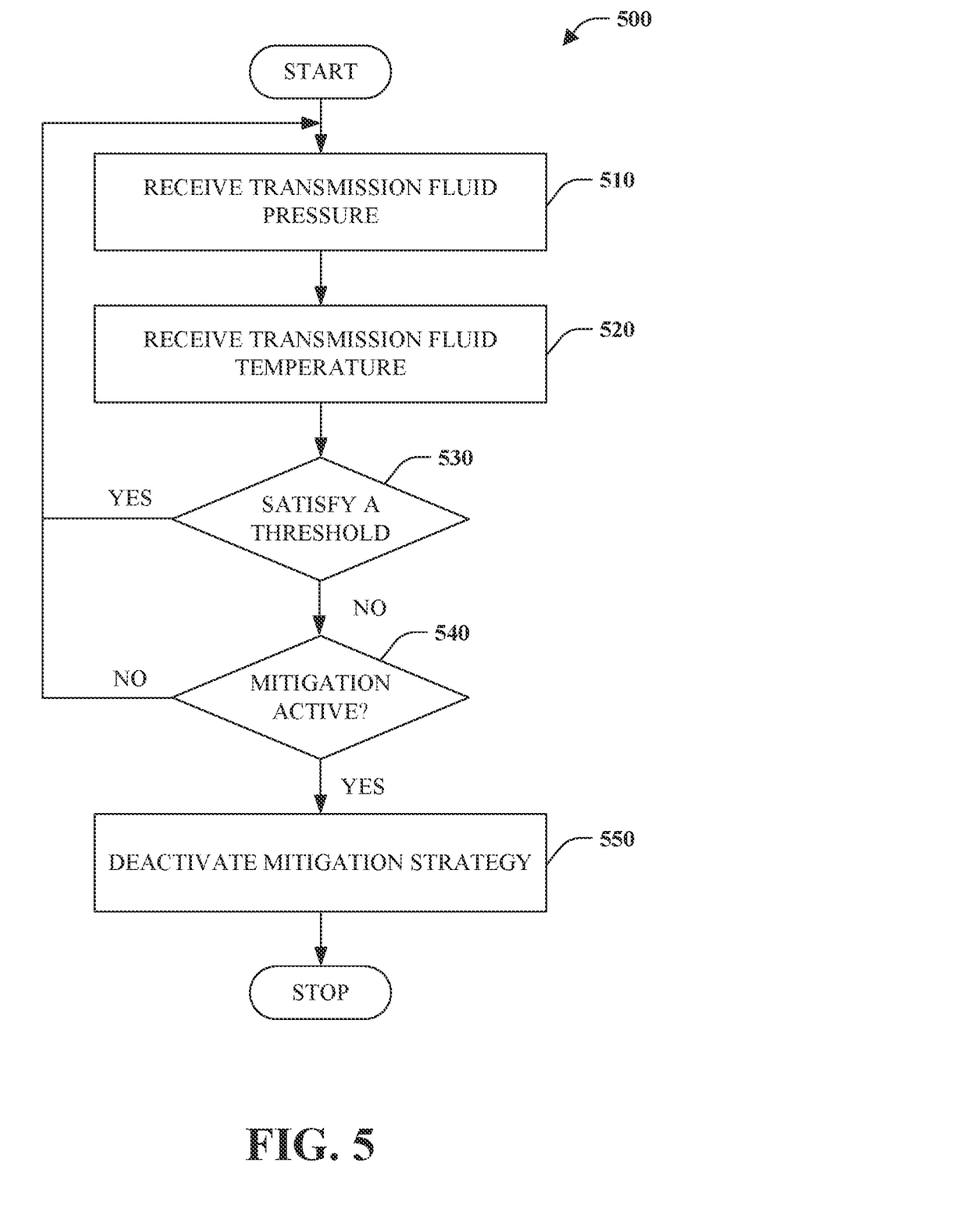
FIG. 5 is a flow chart diagram of a method of thermal mitigation deactivation.

FIG. 5 is a flow chart diagram of a method 500 of thermal mitigation. The method 500 can be performed by the thermal management system 100 of FIG. 1.

At reference numeral 510, a transmission pressure is received, retrieved, or otherwise obtained or acquired. For example, the pressure can be supplied by wire or wirelessly from a pressure sensor associated with the transmission. Suppose a pressure sensor is not available or is faulty. In that case, the pressure can also be derived, inferred, or predicted from other data, including historical data associated with the same or similar transmission and circumstances.

At reference numeral 520, transmission temperature can be received, retrieved, or otherwise obtained or acquired. In accordance with one aspect, the temperature of transmission fluid is received. For example, a temperature in a sump or other reservoir for transmission of fluid or oil can be determined by a temperature sensor and returned. Of course, the external temperature of the transmission case can also be sensed and communicated. The temperature can be received by way of wireless or wired communication.

At numeral 530, a determination is made as to whether a threshold has been satisfied or not. The threshold captures a circumstance for which thermal mitigation is desire, for example, to prevent potential expedited wear, damage, or failure from overheating. The threshold can be a single value or range of values associated with one or more transmission characteristics such as pressure and temperature. In one embodiment, thresholds can be related to both pressure and temperature. A characteristic can be compared with a threshold. In one instance, a threshold temperature can be a value at or above which is a cause for concern due to potential expedited wear or failure. If the threshold is satisfied ("YES"), the method returns to 510 to continue monitoring pressure and temperature. If the threshold is not satisfied ("NO"), the method continues at 540.

At reference 540, a determination is made as to whether or not a thermal mitigation strategy is currently active or is being executed. A thermal mitigation strategy could have been determined and executed in response to a temperature, pressure, or both that satisfied the threshold or, in other words, was undesirable. In one instance, one or more flags, or Boolean values, can be checked to determine if mitigation strategy actions are currently in place. For example, a flag can denote that shift logic is being altered, a mechanical device such as a fan is active, or both. If a thermal mitigation strategy is not currently active or executing ("NO"), the method 500 can return to 510 and receiving transmission pressures followed by temperatures. If a thermal mitigation strategy is currently active or executing ("YES"), the method 500 continues to numeral 550.

At numeral 550, a thermal mitigation strategy is deactivated since the conditions no longer satisfy a threshold for action, at 530, while a thermal mitigation strategy is still active, at 540. Deactivation can correspond to terminating mitigation actions. In one instance, deactivation can reverse actions taken when a thermal mitigation strategy is activated or executed. For example, shift logic can be returned to a default or unaltered state. Additionally, mechanical devices can be turned off or closed in the case of vents. In this manner, performance is not inhibited, and energy is not utilized to operate mechanical devices when transmission conditions are acceptable rather than of concern. In some embodiments, the thermal mitigation strategy can remain active for a predetermined time after conditions are no longer satisfied to reduce cycling of activation and deactivation.

Figure 6:
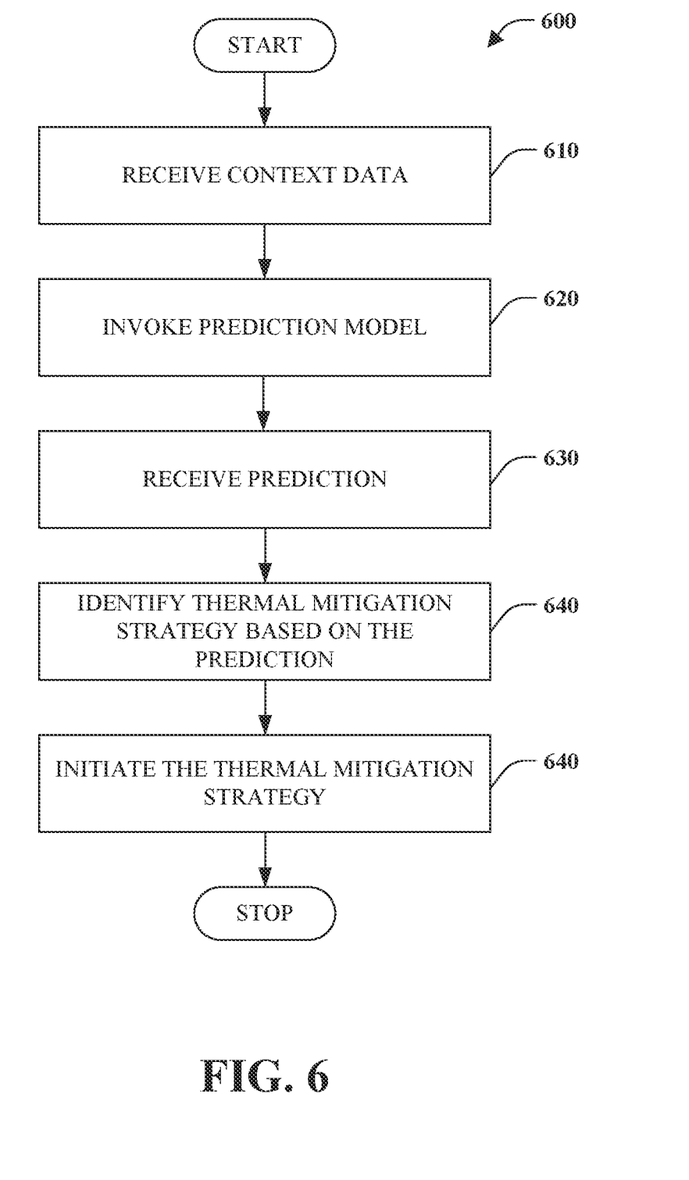
FIG. 6 is a flow chart diagram of a method of predictive initiation of thermal mitigation.

FIG. 6 depicts a method 600 of predictive initiation of thermal mitigation. The method 600 can be performed by the thermal management system 100 and, more specifically, the predictive model component 230 in conjunction with the analysis component 210 and the mitigation component 220.

At reference numeral 610, context data is received, retrieved, or otherwise obtained or acquired. Context data can comprise any data or information surrounding operation of a transmission. For example, the context data can include information regarding driving conditions, including road conditions (e.g., wet, snow-covered . . . ), weather (e.g., temperature, precipitation . . . ), elevation, among other things, and changes over a path to a destination. For instance, context data can identify an upcoming ascent or descent of a hill and changes in weather conditions. Context data can be received from local sensors affixed to a vehicle, remote network-accessible services (e.g., weather, maps, global positioning information . . . ), or both.

At 620, a predictive model is invoked with the context data. A predictive model can be generated to make predictions based on context data, including, but not limited to, a transmission temperature. Although not limited thereto, the predictive model can be an artificial intelligence model including machine learning (e.g., supervised or unsupervised), artificial neural networks, or deep learning. By way of example, the predictive model can correspond to a supervised machine learning model comprising one of various types of regression (e.g., linear, logistic, support vector, decision tree . . . ) to predict transmission fluid temperature. Alternatively, a classifier can be employed to classify a transmission as needing thermal mitigation or not.

At 630, a prediction can be received in response to the invocation of the predictive model. In one instance, the prediction can correspond to a temperature of a transmission or transmission fluid. The prediction can be associated with a degree of confidence. For example, the transmission temperature can be predicted to be 380 degrees Fahrenheit with a degree of confidence of eighty-five percent. In other words, there is an eighty-five percent chance it will be 380 degrees and a fifteen percent chance it is not 380 degrees. The prediction can also be a classification of needing thermal mitigation versus not needing thermal mitigation together with a confidence level. For instance, thermal mitigation is needed with a ninety percent degree of confidence, or thermal mitigation is not needed with a ten percent confidence level.

At numeral 640, a thermal mitigation strategy is determined based on the prediction. The thermal mitigation strategy can comprise one or more actions associated with improving airflow or air temperature surrounding a transmission. In one instance, the extent of thermal mitigation strategy actions can depend on the difference between a predicted temperature and a desired temperature. Further, the degree of confidence associated with a predicted temperature or classification can affect the extent to which actions form part of the thermal mitigation strategy. For example, for a confidence level greater than some predetermined level, such as eighty percent, a maximum mitigation strategy can be employed. Similarly, if the confidence level is at or below another level, such as fifty percent, a reduced strategy can be identified. In addition, if the confidence level is significantly low, such as ten percent or lower, the thermal mitigation strategy can include minimal if any actions.

At 650, the thermal mitigation strategy is initiated. For example, shift control logic can be altered. Additionally, or alternatively, devices can be activated or otherwise changed. For instance, a fan can be activated, and the fan speed adjusted per the strategy.

Figure 7:
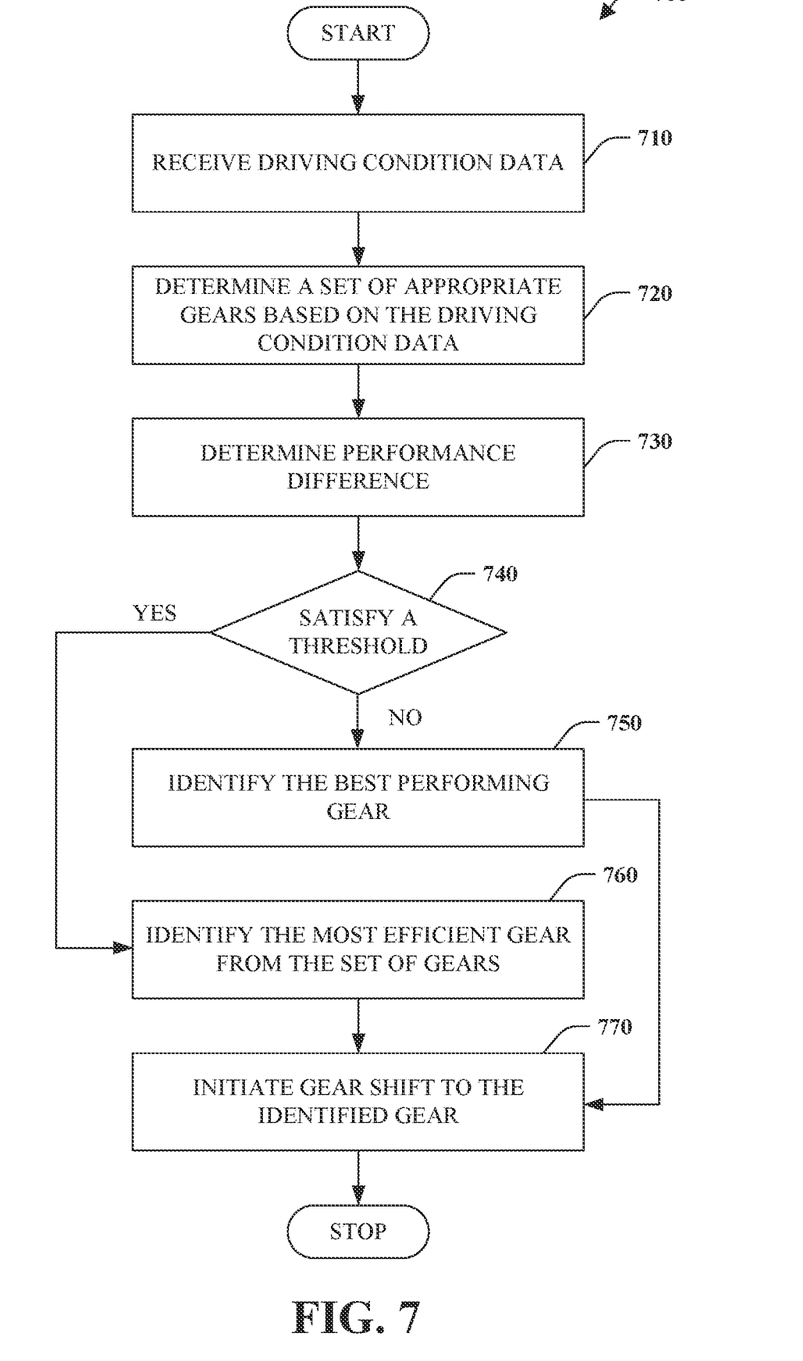
FIG. 7 is a flow chart diagram of a method of altering shift logic of a shift controller.

FIG. 7 is a flow chart diagram of a method 700 of altering shift logic in accordance with an aspect of this disclosure. The method 700 can be performed by the thermal management system 100 in conjunction with a shift controller 120.

At reference numeral 710, driving condition data is received, retrieved, or otherwise obtained or acquired. The driving condition data can be produced by local vehicle sensors, remote sensors, network-accessible services, or a combination. The driving condition data can include vehicle load, speed, current gear, road conditions, terrain (e.g., hills, valleys, and bends), weather, speed limits, traffic, or any other data associated with a vehicle or traveling path.

At numeral 720, a set of appropriate gears can be determined based on the driving condition data. Depending on current gear and speed as well as upcoming terrain, speed limit, or traffic, among other things, a set of two or more gears can be identified as candidates for shifting. For example, the candidate gears can be one gear higher than a current gear and one gear lower than the current gear or two lower gears or two higher gears.

At numeral 730, a performance or power difference is determined. Each gear can have specific performance characteristics. For each candidate gear in the set of two or more gears, the difference between the candidate gear performance or power is computed.

At reference numeral 740, a determination is made as to whether or not the performance difference satisfies a threshold. More specifically, the performance difference is compared to a threshold difference. The threshold difference can be a range representing a predetermined slight difference. As such, the threshold is satisfied when the performance difference is less than or equal to the threshold, and the threshold is not satisfied w % ben the performance difference is greater than the threshold. IF the threshold is not satisfied ("NO") corresponding to a relatively significant performance difference between gears, the method proceeds to numeral 750. By contrast, if the threshold is satisfied ("YES") corresponding to a relatively small performance difference, the method continues at 760.

At 750, the best performing gear is identified. In other words, from a set of candidate gears, the gear with the best performance characteristics for the situation is selected. In this instance, there is a significant difference in gear performance. Consequently, the best-performing gear will be selected to optimize for vehicle performance. The method then proceeds to reference numeral 770.

At 760, the most efficient candidate gear from the set of gears is identified. Each gear can be associated with efficiency characteristics. Here, since the performance difference between gears is small, the most efficient gear can be selected instead of a possibly different higher performance gear. Selection of the most efficient gear can help reduce transmission heat that would result if a more inefficient gear were selected. In accordance with one aspect, this functionality can be activated if the transmission temperature is of concern and thermal mitigation is desired. After identification of the most efficient gear, the method continues at reference numeral 770.

At reference numeral 770, a shift is initiated to the identified gear. In one instance, the identified gear will be selected based on performance. In another instance, the identified gear will be chosen based on efficiency. In this manner, when the gear performance is relatively close, the shift control can be influenced to initiate a more efficient gear than it might otherwise use to aid in thermal mitigation.

The subject disclosure pertains to the technical problem of transmission overheating resulting in inefficiency, expeditious wear, reduced lifespan, and possibly catastrophic failure. The technical solution includes identification and implementation of thermal mitigation strategies to manage transmission temperature. Current or predicted temperature can be compared with a desired or undesired range to determine whether or not to initiate thermal mitigation. In one instance, the thermal mitigation strategy can correspond to altering shift control logic to improve efficiency and reduce heat that would otherwise be produced. In another instance, a mechanical device such as a fan or vent can be activated or controlled to increase airflow around the transmission, reduce the surrounding air temperature, or both.

The description herein focuses on a single sensor, such as one temperature sensor or one pressure sensor. Nevertheless, the disclosure is not limited to a single sensor or single type of sensor. For example, multiple temperature sensors can be employed at different locations to enable detection of hot spots. In particular, temperature sensors can be located in fluid cast-off areas of various gear layers. Such sensors can be informative in identifying specific gear that is running hot, for example, due to an issue with the layer such as insufficient lubrication. This information can be factored into a mitigation strategy, for instance, to lockout or minimize the use of the gear.

The discussion herein has focused on a vehicle transmission gearbox and thermal mitigation for the transmission. However, aspects of this disclosure are not limited to vehicle transmissions. Instead, aspects of this disclosure can be applied to other vehicle and non-vehicle components. For example, initiation of cooling devices such as fans can apply to any number of components whose efficiency and lifespan would increase if operated at a cooler temperature. For example, a radiator fan speed can be adjusted, and vents or secondary fans activated to aid in cooling engine components and maintain a desired temperature.

Conventionally, transmission fluid coolers can be employed to reduce temperature. However, transmission fluid coolers add to vehicle cost and are often a source of failure, resulting in a need for transmission repair or replacement. As such, techniques described herein can serve as a replacement for a transmission fluid cooler. However, the described techniques can also be employed together with a transmission fluid cooler, for instance, adding further cooling ability or backup if the cooler fails or is not adequately sized to cool the transmission as needed. Further yet, to the extent the fluid cooler is adjustable and controllable, the fluid cooler could be further added as part of a thermal mitigation strategy.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

To provide a context for the disclosed subject matter. FIG. 9, as well as the following discussion, is intended to provide a brief, general description of a suitable environment in which various aspects of the disclosed subject matter can be implemented. However, the suitable environment is solely an example and is not intended to suggest any limitation regarding scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

Figure 8:
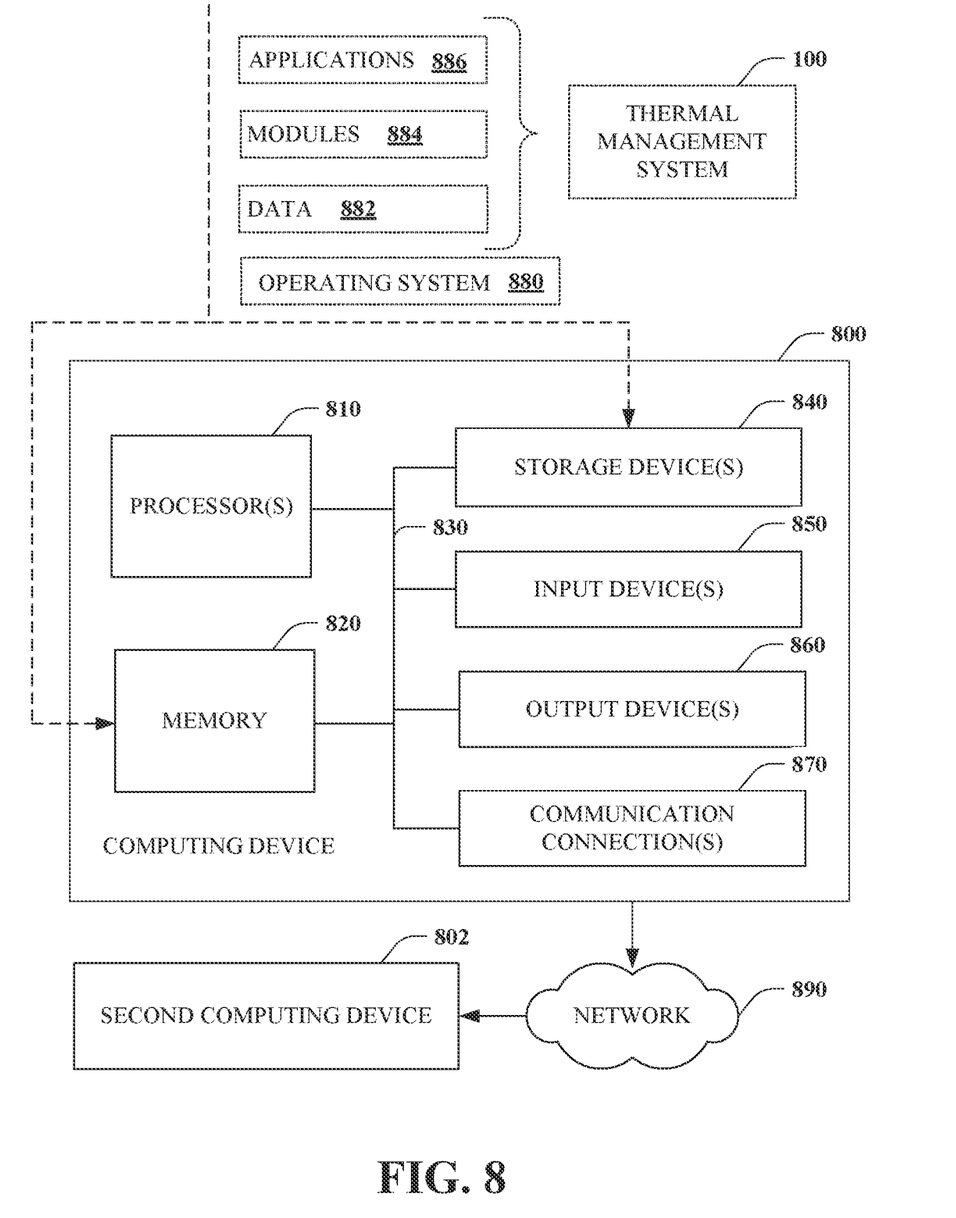
FIG. 8 is a block diagram illustrating a suitable operating environment for aspects of the subject disclosure.

With reference to FIG. 8, illustrated is an example computing device 800 (e.g., desktop, laptop, tablet, watch, server, hand-held, programmable consumer or industrial electronics, set-top box, game system, compute node . . . ).

The computing device 800 includes one or more processor(s) 810, memory 820, system bus 830, storage device(s) 840, input device(s) 850, output device(s) 860, and communications connection(s) 870. The system bus 830 communicatively couples at least the above system constituents. However, the computing device 800, in its simplest form, can include one or more processors 810 coupled to memory 820, wherein the one or more processors 810 execute various computer-executable actions, instructions, and or components stored in the memory 820.

The processor(s) 810 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 810 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 810 can be a graphics processor unit (GPU) that performs calculations concerning digital image processing and computer graphics.

The computing device 800 can include or otherwise interact with a variety of computer-readable media to facilitate control of the computing device to implement one or more aspects of the disclosed subject matter. The computer-readable media can be any available media accessible to the computing device 800 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 800. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 820 and storage device(s) 840 are examples of computer-readable storage media. Depending on the configuration and type of computing device, the memory 820 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 800, such as during start-up, can be stored in non-volatile memory, while volatile memory can act as external cache memory to facilitate processing by the processor(s) 810, among other things.

The storage device(s) 840 include removable/non-removable, volatile/non-volatile storage media for storage of vast amounts of data relative to the memory 820. For example, storage device(s) 840 include, but are not limited to, one or more devices such as a magnetic or optical disk drive, floppy disk drive, flash memory, solid-state drive, or memory stick.

Memory 820 and storage device(s) 840 can include, or have stored therein, operating system 880, one or more applications 886, one or more program modules 884, and data 882. The operating system 880 acts to control and allocate resources of the computing device 800. Applications 886 include one or both of system and application software and can exploit management of resources by the operating system 880 through program modules 884 and data 882 stored in the memory 820 and/or storage device(s) 840 to perform one or more actions. Accordingly, applications 886 can turn a general-purpose computer 800 into a specialized machine in accordance with the logic provided thereby.

All or portions of the disclosed subject matter can be implemented using standard programming and/or engineering techniques to produce software, firmware, hardware, or any combination thereof to control the computing device 800 to realize the disclosed functionality. By way of example and not limitation, all or portions of the thermal management system 100 can be, or form part of, the application 886, and include one or more modules 884 and data 882 stored in memory and/or storage device(s) 840 whose functionality can be realized when executed by one or more processor(s) 810.

In accordance with one particular embodiment, the processor(s) 810 can correspond to a system on a chip (SOC) or like architecture including, or in other words integrating, both hardware and software on a single integrated circuit substrate. Here, the processor(s) 810 can include one or more processors as well as memory at least similar to the processor(s) 810 and memory 820, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the thermal management system 100 and/or functionality associated therewith can be embedded within hardware in a SOC architecture.

The input device(s) 850 and output device(s) 860 can be communicatively coupled to the computing device 800. By way of example, the input device(s) 850 can include a pointing device (e.g., mouse, trackball, stylus, pen, touchpad . . . ), keyboard, joystick, microphone, voice user interface system, camera, motion sensor, and a global positioning satellite (GPS) receiver and transmitter, among other things. The output device(s) 860, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 850 and output device(s) 860 can be connected to the computing device 800 by way of wired connection (e.g., bus), wireless connection (e.g., Wi-Fi, Bluetooth . . . ), or a combination thereof.

The computing device 800 can also include communication connection(s) 870 to enable communication with at least a second computing device 802 utilizing a network 890. The communication connection(s) 870 can include wired or wireless communication mechanisms to support network communication. The network 890 can correspond to a local area network (LAN) or a wide area network (WAN) such as the Internet. The second computing device 802 can be another processor-based device with which the computing device 800 can interact. In one instance, the computing device 800 can perform operations associated with the thermal management system 100, and the second computing device 802 can correspond to one or more servers or other systems that provide network-accessible services for use by the thermal management system 100. For example, the second computing device 802 can supply valuable driving data for use by the thermal management system 100 in predicting temperatures that would benefit from thermal mitigation.

What has been described above includes examples of aspects of the claimed subject matter. It is, of course, not possible to describe every conceivable combination of components or methodologies for purposes of describing the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
   a processor coupled to a memory that includes instructions that, when executed by the processor, cause the processor to:
   determine a pressure state based on a transmission fluid pressure received from a pressure sensor;
   evaluate temperature of a transmission received from a temperature sensor with respect to a threshold temperature, wherein the threshold temperature depends on the pressure state;
   determine a thermal mitigation strategy when the temperature satisfies the threshold temperature based on the pressure state and temperature; and
   initiate execution of the thermal mitigation strategy.

2. The system of claim 1, wherein the thermal mitigation strategy comprises modification of shift control logic.

3. The system of claim 2, wherein the modification of the shift control logic comprises locking out a gear from a set of available gears for selection.

4. The system of claim 2, wherein the modification of the shift control logic comprises causing the transmission to remain in direct drive.

5. The system of claim 1, wherein the thermal mitigation strategy comprises instructing a torque control unit of an engine to limit the torque to the transmission.

6. The system of claim 1, wherein the thermal mitigation strategy comprises activation of a mechanical device to increase airflow or reduce air temperature surrounding the transmission.

7. The system of claim 6, wherein the mechanical device is an adjustable speed radiator fan, and activation comprises increasing the radiator fan speed.

8. The system of claim 6, wherein the mechanical device is a duct and activation comprises opening the duct.

9. A method, comprising:
   evaluating transmission fluid pressure received from a pressure sensor;
   evaluating a temperature of a transmission received from a temperature sensor;
   triggering generation of a thermal mitigation strategy based on the pressure and temperature of the transmission and in response to the temperature satisfying a temperature threshold associated with intervention, wherein the threshold temperature depends on the pressure state; and
   initiating execution of the thermal mitigation strategy.

10. The method of claim 9, further comprising:
    classifying the pressure as low, normal, or high; and
    determining the temperature threshold based on the classification.

11. The method of claim 9, wherein triggering generation of the thermal mitigation strategy comprises specifying one or more mitigation actions based on the pressure and temperature.

12. The method of claim 11, wherein triggering generation of the thermal mitigation strategy comprises specifying a change to shift control logic that reduces heat.

13. The method of claim 11, wherein triggering generation of the thermal mitigation strategy comprises specifying activation of a physical device to increase airflow or reduces air temperature in an environment surrounding the transmission.

* * * * *